United States Patent
Marupaduga et al.

(10) Patent No.: US 10,834,678 B1
(45) Date of Patent: Nov. 10, 2020

(54) PROACTIVE DETERMINATION OF AN UPDATED TRANSMISSION POWER

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/426,734

(22) Filed: May 30, 2019

(51) Int. Cl.
| | |
|---|---|
| *H04W 52/14* | (2009.01) |
| *H04W 52/24* | (2009.01) |
| *H04W 4/02* | (2018.01) |
| *H04W 72/04* | (2009.01) |

(52) U.S. Cl.
CPC .......... *H04W 52/14* (2013.01); *H04W 4/025* (2013.01); *H04W 52/241* (2013.01); *H04W 52/243* (2013.01); *H04W 72/0473* (2013.01)

(58) Field of Classification Search
None
See application file for complete search history.

(56) References Cited

U.S. PATENT DOCUMENTS

| | | | |
|---|---|---|---|
| 2011/0039569 A1 | 2/2011 | Narasimha et al. | |
| 2015/0271761 A1 | 9/2015 | Park | |
| 2019/0223077 A1* | 7/2019 | Kwok | H04M 11/06 |
| 2019/0253988 A1* | 8/2019 | Khoshnevisan | H04W 52/20 |
| 2020/0128494 A1* | 4/2020 | Lu | H04W 52/38 |

OTHER PUBLICATIONS

Preinterview First Office Action dated Dec. 26, 2019 in U.S. Appl. No. 16/134,858, 4 pages.
Notice of Allowance dated Sep. 4, 2020 in U.S. Appl. No. 16/750,147, 8 pages.
Notice of Allowance dated Aug. 26, 2020 in U.S. Appl. No. 16/134,858, 8 pages.

* cited by examiner

*Primary Examiner* — Otis L Thompson, Jr.

(57) ABSTRACT

Systems and methods are provided for proactively determining downlink power for transmission to a wireless communication device. The system comprises an access point that is configured to transmit wireless downlink signals to a WCD using a first communication protocol and a second communication protocol. A processor collects at least one set of data, which may include historical and current data such as noise interference and GPS location. Then, the processor analyzes the at least one set of data, and determines an updated transmission power for each of the first communication protocol and the second communication protocol. Subsequently, the system proactively instructs the WCD to communicate to the access point the updated transmission power for each communication protocol.

20 Claims, 6 Drawing Sheets

PROACTIVE DETERMINATION OF AN UPDATED TRANSMISSION POWER

TECHNICAL FIELD

The present invention relates to proactive uplink transmission power variation on different communication protocols, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, the power transmission for each of two transmitters in a user equipment (UE) or wireless communication device (WCD) are proactively updated based on the analysis of one or more sets of data. As wireless technology advances, the technology used by WCDs to conduct wireless communication sessions between the WCD and an access point or base station is changing. Currently, based on an analysis of one or more sets of data, an access point communicates with the WCD, instructing it to ramp up the uplink power transmission at intervals until the optimal power level is reached for the wireless communication session. The uplink power transmission to a WCD would begin at a specified level somewhere below 23 dBm. The system would then ramp up the transmission power incrementally until the optimal transmission power for each protocol was reached. The incremental increase in uplink power transmission takes several steps and may lead to a diminished user experience. In the present system, the uplink power transmission is proactively updated based on one or more types of historical and current data such as noise interference, time of day, and location of the WCD, resulting in the access point proactively instructing the WCD to adjust the transmission power directly to the specific level determined based on the data analyzed. As such, the multiple steps of incrementally increasing uplink power transmission are eliminated by having the transmission power automatically and proactively set to the optimal power level, thereby leading to a more efficient and satisfactory user experience.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |

-continued

| | |
|---|---|
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

As used herein, WCDs that are spatially distributed with respect to an access point may be said to be in different locations relative to the access point. Such distance-related terminology may be read to mean a distance at ground level between the ground level of the access point and the ground level of the device, it may refer to the distance actually traveled by the signal (in aspects, affected by multipath, reflection, etc.), and/or it may refer to a signal strength (e.g., a first device is further from an access point than a second device based on the downlink signal received at the first device being weaker than the downlink signal received at the second device).

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

Generally speaking, many modern WCD comprise at least two transmitters; in some configurations, a WCD may operate using dual connectivity. That is, the WCD may use at least a first of its transmitters to communicate a first uplink signal to a first node at an access point and at least a second of its transmitters to communicate a second uplink signal to a second node at the access point. In other configurations, a WCD may operate using single connectivity, wherein it uses one or more of its transmitters to communicate with a single access point, base station, or cell site at one or more nodes. Whether using dual connectivity or single connectivity, a WCD may have a pre-set maximum total uplink power (as will be discussed in greater detail below). Conventionally, a communication session between a WCD and an access point comprises an uplink handshake, wherein the uplink handshake is an uplink signal from the WCD to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, WCD may not increase the power of the transmission (it may retry again later or attempt to connect to a different access point, for example).

Further, as communication protocols rapidly evolve from 3G, to 4G/LTE, to 5G, it is conceived that a WCD may benefit from connecting to more than one node using more than one protocol. For example, a 5G communication session may have a higher throughput, used for a data session, and a 4G communication session may have characteristics that make it more suitable for a voice session. Thus, it may be desirable for the WCD to be simultaneously connected to more than one protocol.

The present disclosure is directed to systems, methods, and computer readable media that are an improvement over conventional communications between a WCD and an access point. In accordance with aspects described herein, one or more sets of data for a wireless communication session between a WCD and an access point can be collected and analyzed to dynamically determine how the device's transmission power should be allocated between a first communication protocol and a second communication protocol for an optimal and effective wireless communication session.

Being able to dynamically modify transmission power of each of the first communication protocol and second communication protocol based on the analysis of at least one set of data and determination of an updated transmission power enables the WCD to communicate more effectively. Further, this may permit the WCD to realize the full benefit of diverse protocols and wireless service features, such as the dependability of 4G and high-bandwidth of 5G (or to use the benefits of any other combination of two protocols). Further, by proactively determining the updated transmission power for each communication protocol so that the transmission power is initially set to the optimal value, it may allow the network to better balance WCDs between cell locations, expediting communication sessions, and consequently reducing network loads.

Accordingly, a first aspect of the present disclosure is directed to a system for proactively determining downlink power for transmission to a WCD, the system comprising an access point configured to transmit wireless downlink signals to the WCD using a first communication protocol and a second communication protocol and a processor. The processor is configured to collect at least one set of data over a predetermined time period and then analyze the at least one set of data collected to determine an updated transmission power for the first communication protocol and the second communication protocol for a wireless communication session between the WCD and the access point. In response to the determined updated transmission power, the processor then proactively instructs the WCD to subsequently communicate to the access point the updated transmission power for the first communication protocol and the second communication protocol.

A second aspect of the present disclosure is directed to a method for proactively determining uplink power for transmission to a WCD. The method comprises receiving an indication that wireless downlink signals have been transmitted by an access point to the WCD, collecting at least one set of data over a predetermined time period, analyzing the at least one set of data collected to determine an updated transmission power for the first communication protocol and the second communication protocol for a wireless communication session between the WCD and the access point, and in response to the determined updated transmission power, proactively instructing the WCD to subsequently communicate to the access point the updated transmission power for the first communication protocol and the second communication protocol.

Another aspect of the present disclosure is directed to a non-transitory computer storage media storing computer-useable instructions that, when used by one or more processors, cause the processors to receive an indication that wireless downlink signals have been transmitted by an access point to the WCD, collect at least one set of data over a predetermined time period, analyze the at least one set of data collected to determine an updated transmission power for the first communication protocol and the second communication protocol for a wireless communication session between the WCD and the access point, and, in response to the determined updated transmission power, proactively instruct the WCD to subsequently communicate to the access point the updated transmission power for the first communication protocol and the second communication protocol.

Figure 1:
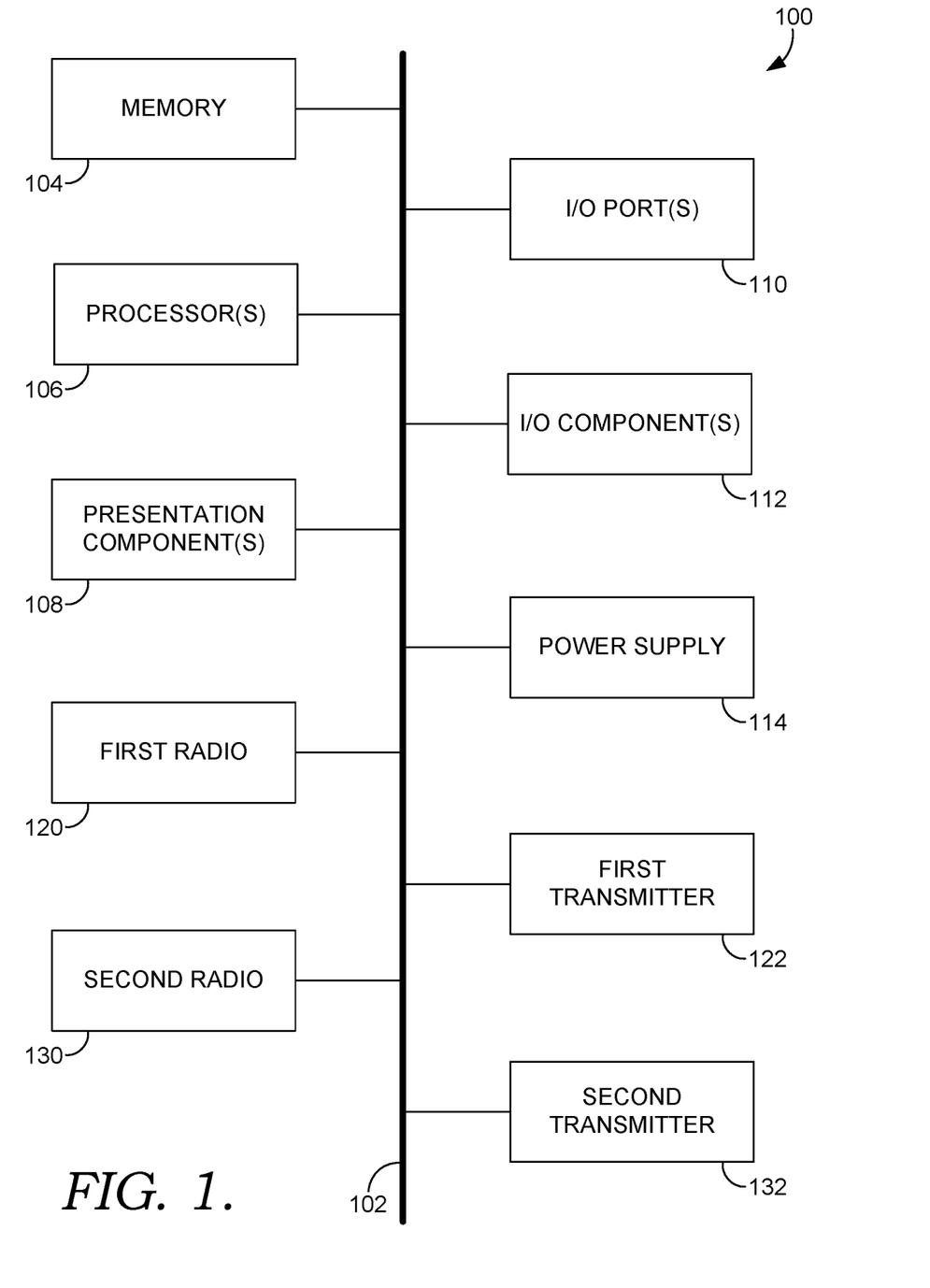
FIG. 1 depicts a diagram of an exemplary computing environment suitable for use in implementations of the present disclosure, in accordance with aspects herein.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE/WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, power supply 114, first radio 120, second radio 130, first transmitter 122 and second transmitter 132. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with a wireless telecommunications network. In aspects, the first radio 120 utilizes a first transmitter 122 to communicate with the wireless telecommunications network and the second radio 130 utilizes the second transmitter 132 to communicate with the wireless telecommunications network. Though two radios are shown, it is expressly conceived that a computing device with a single radio (i.e., the first radio 120 or the second radio 130) could facilitate communication with the wireless telecommunications network via both the first transmitter 122 and the second transmitter 132. Illustrative wireless telecommunications technologies include CDMA, GPRS, TDMA, GSM, and the like. One or both of the first radio 120 and the second radio 130 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
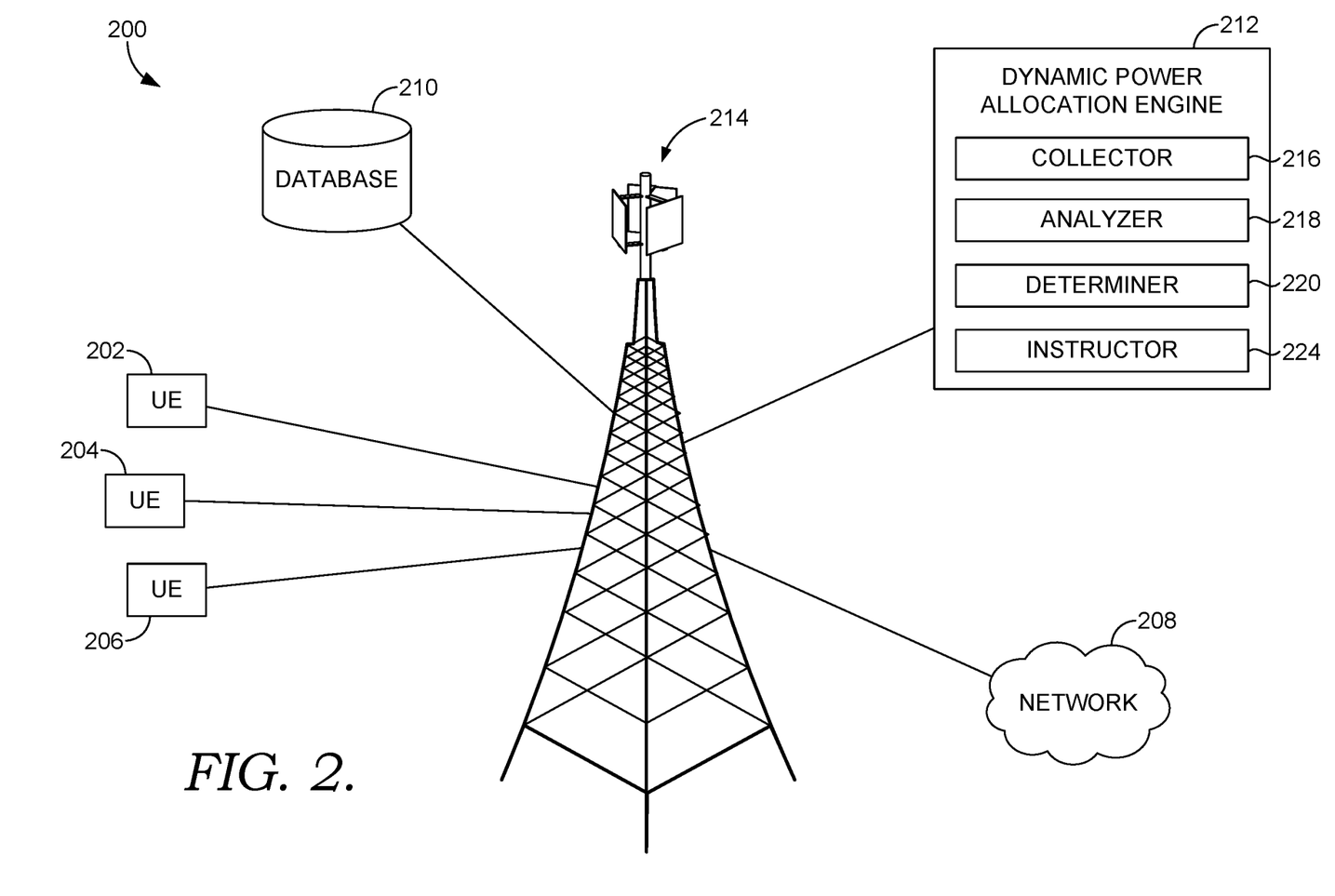
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), access point 214 (which may be a cell site, base station, or the like), network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with user devices, such as user devices 202, 204, and 206 that are located within the geographical area, or cell, covered by radio antennas of cell site 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with dynamic power allocation engine 212, which comprises various components that are utilized, in various implementations, to perform one or more methods for proactively instructing a WCD to communicate to the access point 214 the determined updated transmission power for the first communication protocol and the second communication protocol. In some implementations, dynamic power allocation engine 212 comprises components including a collector 216, a monitor 217, an analyzer 218, determiner 220, and an instructor 224. However, in other implementations, more or less components than those shown in FIG. 2 may be utilized to carry out aspects of the invention described herein.

The collector 216 of the dynamic power allocation engine 212 is generally responsible for collecting at least one set of data over a predetermined time period from various user devices, such as user devices 202, 204, and 206, which are within the coverage area of access point 214. Data sent from a user device to the access point 214 may comprise location information of the user device and network parameters determined at or by the user device that includes information on how good or bad the communication channel quality is (SINR, pathless, or the like) and the device power levels (maximum uplink powers and maximum total uplink power). Location information may be based on GPS or other satellite location services, terrestrial triangulation, an access point location, or any other means of obtaining coarse or fine location information. The at least one set of data collected may also include signal to noise ratio for one or more transitory signals communicated between the WCD and each of the first communication protocol and second communication protocol. Network parameters may indicate a realized uplink and/or downlink transmission data rate, observed signal-to-interference-plus-noise ratio (SINR) and/or signal strength at the user device, path loss, or throughput of the connection. Location and/or network parameters may take into account the user device capability, such as the number of antennas and the type of receiver used for detection. Additionally, the at least one set of data may also comprise path loss between the WCD and each of the first communication protocol and the second communication protocol and sector interference in a predetermined geographical region or location. Further, the collector 216 may collect the at least one set of data at predetermined time intervals throughout the day or continuously and any and all variations of collection intervals are contemplated herein.

The analyzer 218 is generally responsible for analyzing the at least one set of data collected by the collector 216 for the determination of an updated transmission power for the first communication protocol and the second communication protocol. The analyzer 218 reviews the collected data, such as the location and any network parameter information collected by the collector 216 for the determination of the updated transmission power. The analyzer 218 is generally responsible for determining network parameters and a plurality of uplink footprints emitted by each of the user devices 202, 204, and 206. As used herein, the term uplink footprint may be considered to be synonymous with a radiation pattern of a user device, such as user device 202, 204, and 206 at a particular time. The uplink footprint may generally refer to the area in space in which the user device 202, 204, and 206 emits a transitory signal having enough signal strength (dBm) to be effectively received and processed by an access point, such as access point 214, to sustain a wireless communication session. The analyzer 218 may compare the location of the user devices with respect to the access point 214, the path loss and the SINR of the downlink and/or uplink signals (among other network parameters) with the plurality of uplink footprints. In aspects, when multiple network parameters and/or location information is received from the same user device, the analyzer may use an average, mean, median or any other statistical analysis to determine a single network parameter and/or location of a particular user device.

The determiner 220 is generally responsible for determining an updated transmission power for the first communication protocol and the second communication protocol for a wireless communication session between the WCD and the access point 214. After the analyzer 218 has analyzed the at least one set of data collected by the collector 216, the determiner 220 will determine the optimal transmission power for the first communication protocol and the second communication protocol to conduct a wireless communication session. For example, based on data such as location of the WCD, time of day, and historical noise interference at the specific location for a relevant time period (e.g. same time of day or window of time within a day), the determiner 220 may determine that the first communication protocol (e.g. 5G wireless network) power should be at 10 dBm for an optimal wireless communication session between the WCD and the access point. At the same time, the determiner 220 may determine that for the optimal wireless communication session between the WCD and the access point, the second communication protocol (e.g. 4G wireless network) should be at 3 dBm. The determiner 220 may determine the same updated power transmission power for the first and second communication protocols or different updated power transmission power based on a variety of historical and current data analyzed by the analyzer 218.

In other aspects, the determiner 220 may determine that the updated transmission power for each or both the first communication protocol and second communication protocol is 0 dBm or the maximum 23 dBm. Further, the sum of the updated transmission power for the first communication protocol and the second communication protocol cannot exceed 29 dBm. The determiner 220 may determine multiple updated transmission powers for the first communication protocol and the second communication protocol throughout a predetermined time period based on the analysis of the at least one set of data by the analyzer 218. Additionally, each updated transmission power determined for each of the first and second communication protocol may vary.

After the analyzer 218 has analyzed the at least one set of data collected and the determiner 220 has determined the updated power transmissions for the first communication protocol and the second communication protocol, the instructor 224 proactively instructs the WCD to subsequently communicate to the access point 214 the updated transmission power for the first and second communication protocols. In the example above, the instructor 224 would instruct the WCD to communicate to the access point 214 that the updated transmission power for the first communication protocol is 10 dBm and the updated transmission power for the second communication protocol is 3 dBm.

Figure 3A:
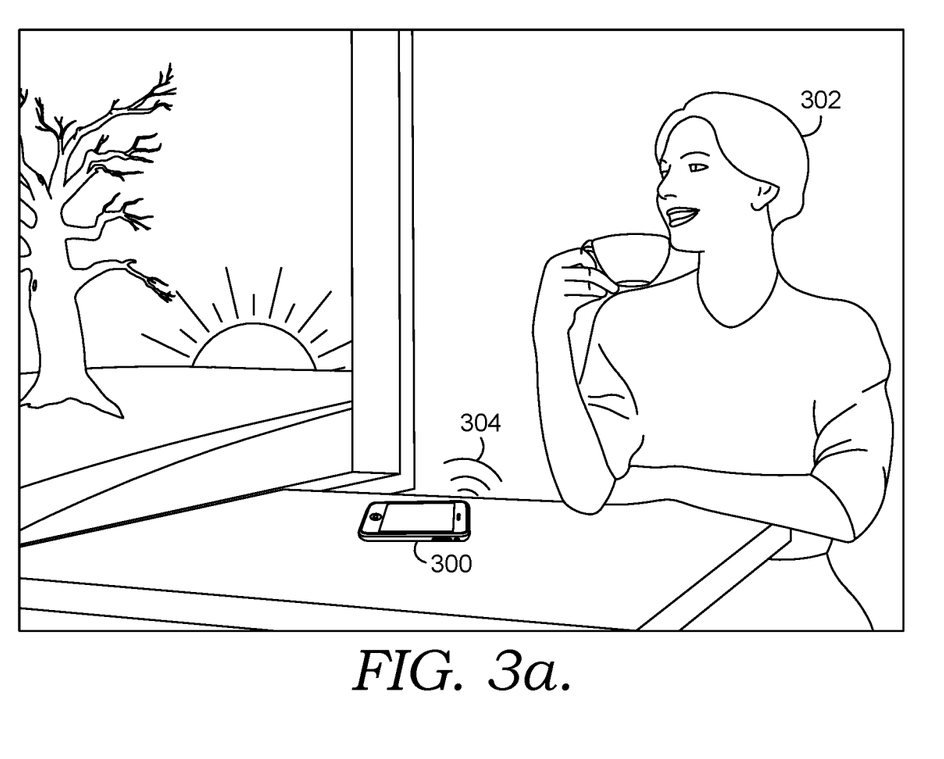
FIGS. 3a-3c depict various scenarios in which one or more wireless communication sessions are active between a WCD and an access point, in accordance with aspects herein.
Figure 3B:
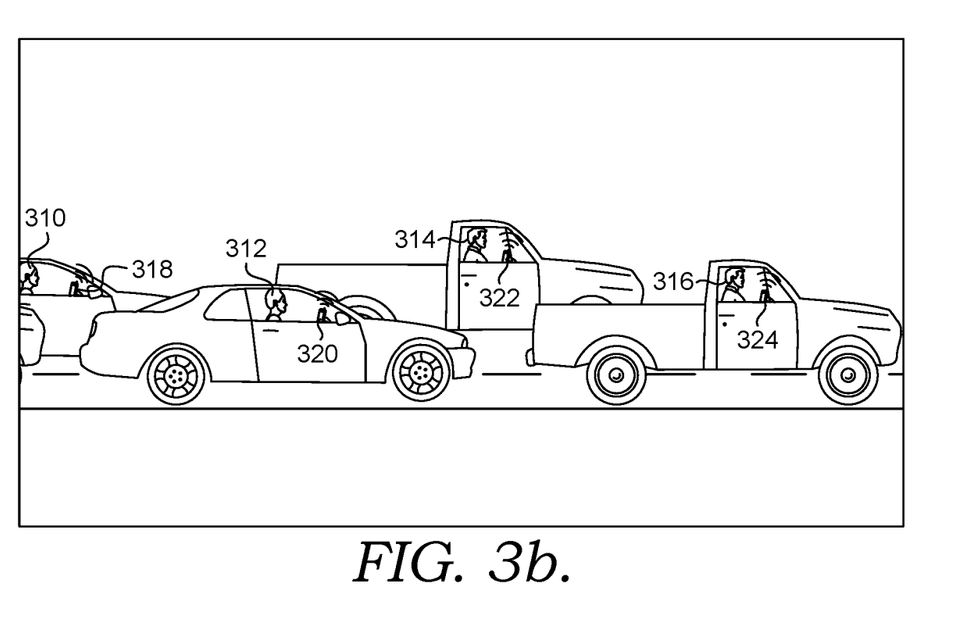
Figure 3C:
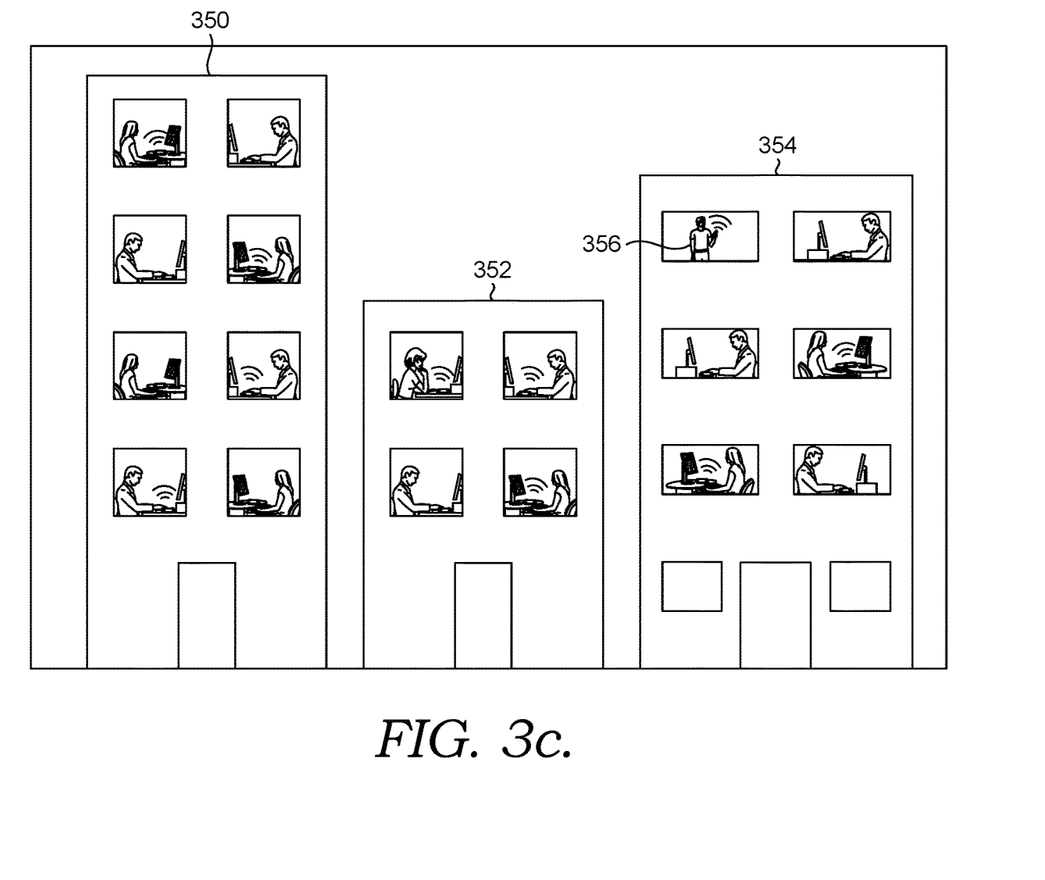

Next, FIGS. 3a-3c, each depict different scenarios where one or more WCDs are in use and an active wireless communication session is taking place. These figures are included to demonstrate how the updated transmission powdered determined by the determiner 220 may change throughout the course of a day based on the at least one set of data collected and analyzed. In FIG. 3a, an individual 302 is shown sitting at a table at home drinking coffee. The WCD 300 is also depicted and a signal 304 is shown being emitted from the WCD 300. FIG. 3b illustrates a setting in which multiple individuals 310, 312, 314, and 316 are utilizing WCDs 318, 320, 322, and 324 during high traffic volume on the road. Each WCD 318, 320, 322, 324 are emitting signals to an access point (not shown). FIG. 3c illustrates multiple individuals within offices in three office buildings. This illustration's purpose is to depict the use of multiple WCDs 300 during the work day within a small geographic area, cell, or sector. While not shown, the buildings 350, 352, and 354 may be located within a dense metropolitan area. As such, while only these buildings are shown with multiple individuals utilizing WCDs 300, there may be many more buildings within the same area that have several hundreds or even thousands of individuals utilizing WCDs 300 during the work day that will impact the noise interference. Additionally, the noise interference that may impact the wireless communication session may vary throughout the day in each location based on the proximity of other WCDs within the same area.

Figure 4:
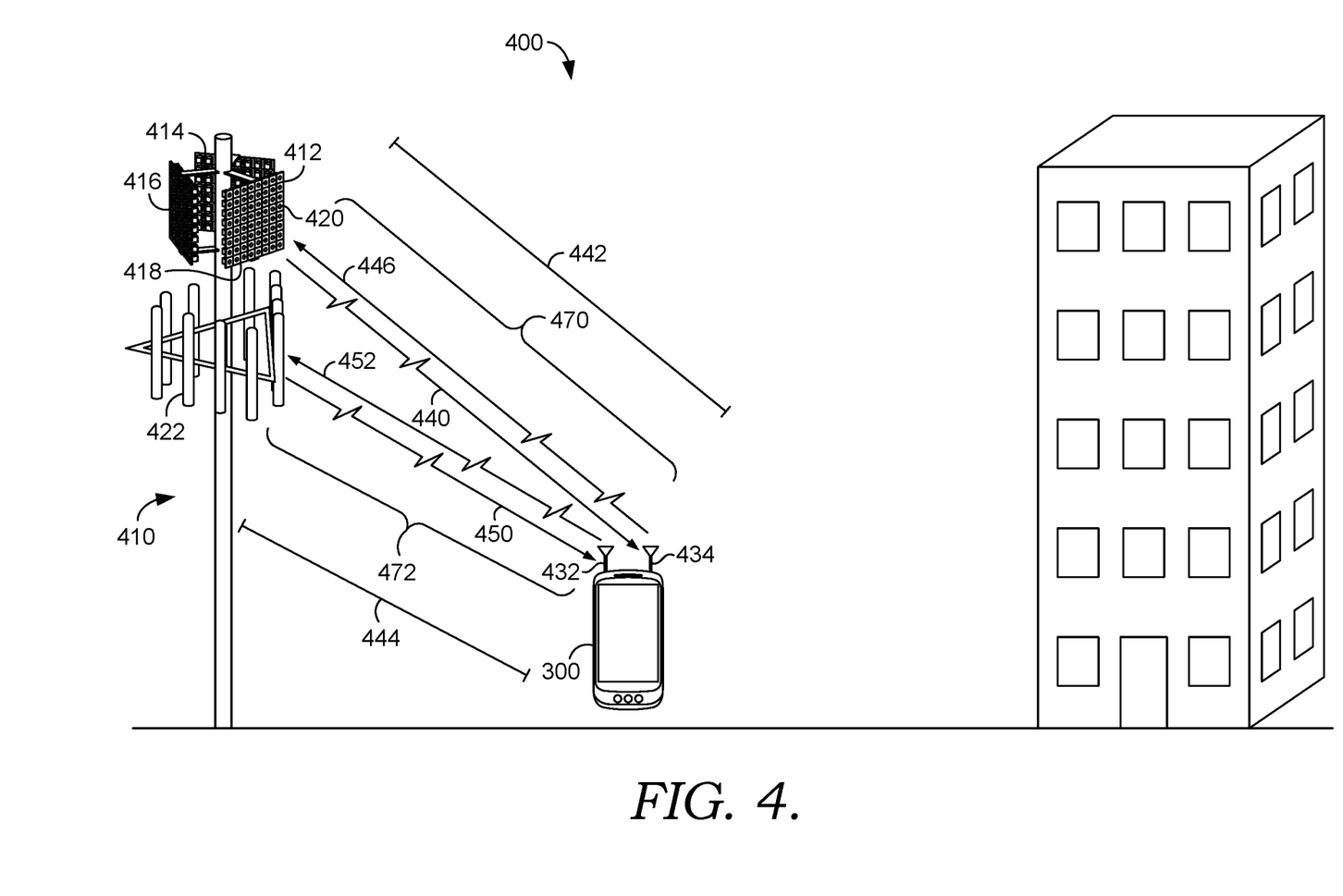
FIG. 4 illustrates a representation of an access point wirelessly communicating with a WCD, in accordance with aspects herein.

Next, FIG. 4 illustrates a representation of system 400 comprising an access point 410 wirelessly communicating with a WCD 300 in accordance with aspects herein. The access point 410 and the WCD 300 are but one example of suitable configurations and are not intended to suggest any limitations as to the scope of use or functionality of embodiments described herein. For example, in other aspects, the system 400 may comprise additional access points for wireless communication sessions with the WCD 300. In some aspects, the access point 410 may also be a base station 300. FIG. 4 illustrates one example of a suitable configuration and is not intended to suggest any limitations as to the scope of use or functionality of embodiments described herein. Neither should the configuration be interpreted as having any dependency or requirement relating to any one or combination of components illustrated.

In some aspects, the access point 410 comprises a first node 412 that is a 5G or MIMO node, and a second node 422 that is a 4G or eNodeB node. As such, the first node 412 may wirelessly communicate with the WCD 300 via a first communication protocol 470 (5G), and the second node 422 may wirelessly communicate with the WCD 300 via a second communication protocol 472 (4G). In other aspects, the first node 412 may be any of a first type of node configured to wirelessly communicate with the WCD 300 via the first wireless communication protocol 470, and the second node 422 may be any of a second type of node configured to wirelessly communicate with the WCD 300 via the second wireless communication protocol 472. For example, the first node 412 may be an eNodeB, capable of wirelessly communicating with the WCD 300 via 4G or LTE communication protocols. The second node 422 may be a nodeB, capable of wirelessly communicating with the WCD 300 via 3G. Any combination thereof is expressly conceived and the present disclosure is not limited to any one or more particular types of access points nor any one or more particular types of wireless communication protocols.

As shown, the first node 412 and second node 422 may be co-located at the same access point 410. However, alternatively, the first node 412 and second node 422 may be located at different access points, resulting in multiple access points 410 (not shown). As used herein, the term node is used to refer to network access technology, such as eNode, gNode, etc. In other aspects, the term node may be used to refer to one or more antennas being used to communicate with the WCD 300. In aspects, the one or more antennas may be dipole antennas, having a length, for example, of ¼, ½, 1, or 1½ wavelength. In aspects, the antenna array may be an active antenna array, FD-MIMO, massive MIMO, 3G, 4G, 5G, and/or 802.11. While dipole antennas are referred to herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive).

Additionally, as shown in FIG. 4, the first node 412 comprises three antenna arrays 412, 414, and 416 each comprising 64 antennas 420 arranged in an 8×8 structure. In other aspects, the first node 412 may comprise antennas arranged in an 8×4, 4×8, or 4×4 configuration. Each of the antenna arrays 414, 416, and 418 comprises a dedicated power supply (not shown). The power supply supplies power having a certain phase and amplitude to each antenna 414, 416, and 418. In an embodiment, the power supply comprises a power amplifier and power controller. In other aspects, the power supply may additionally comprise a processor for making power supply determinations.

The second node 422 also comprises multiple separate antennas. The antennas found on the first node 412 and second node 422 differ in construction, technology and capability. However, it is contemplated that in some aspects, the first node 412 and second node 422 may comprise similar or the same types of antennas and each node may comprise one or more antennas. Also, as shown, the first node 412 and the second node 422 are located atop a structure; however, the first node 412 and second node 422 may be disposed in a variety of manners, including but not limited to, on a tower, on a structure, disposed on a mobile asset (e.g., a vehicle), in the window of a building, or the like. Further, despite the first node 412 and the second node 422 being shown as macro cells, the first node 412 and/or the second node 422 may be a macro cell, micro cell, femto cell, small cell, router, repeater, or any other *nexus* between the wireless communication device and the wireless network.

In an embodiment, the position of WCD 300 is determined. In aspects, WCD 300 provides location and channel quality information to the wireless communication network via the access point 410. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point 410 or at the individual antenna array of the access point 410. In other aspects, the processing of said information may be done remotely.

Further, historical positions of a plurality of WCD 300 within the cell may be analyzed to forecast likely positions of WCD 300 and associated channel quality. In such an embodiment, historical location and channel quality information of the type described above may be analyzed to determine an average distribution and channel quality of a plurality of WCD 300 within a cell at a predetermined time. Such forecasts may be different during the working hours of a business day, for example, than a Friday evening, which may yet be different than during a Sunday morning. Analyzed historical data and accompanying forecasts may be as granular as 7:30 am-8:30 am on a Monday morning (corresponding to Monday morning rush hour) or as broad as August-May (corresponding to an example of a school year).

In yet another embodiment, network data may be used, at least in part, to determine the updated transmission power. Network data may be processed locally at the access point 410, or the individual antenna array of the access point. In other aspects, the network data may be processed remotely. Network data may include tonnage, number of connected devices, registration address of devices, and/or biographic information associated with one or more user devices supplied by a registration and/or AAA system.

As illustrated in FIG. 4, the first node 412 may communicate a first wireless downlink signal 440 to the WCD 300, and a first transmitter 434 of the WCD 300 may communicate a first wireless uplink signal 446 to the first node 412. The second node 422 may communicate a second wireless downlink signal 450 to the WCD 330, and a second transmitter 432 of the WCD 330 may communicate a second wireless uplink signal 452 to the second node 412. Any one or more of the first node 412 and the second node 422 may comprise and/or be coupled to (including communicatively coupled to) a processor, such as a server, database, computer, a combination of components such as the dynamic power allocation engine 212, a radio, a controller, or the like. In aspects, the processor may be configured to perform operations comprising determining an updated transmission power for the first communication protocol 442 and the second communication protocol 444 for a wireless communication session between the WCD 300 and the first node 412 and second node 422 at the access point 410. In response to such a determination, the instructor 224 may proactively instruct the WCD 300 to subsequently communicate to the access point the updated transmission power for the first communication protocol 442 and the second communication protocol 444.

As seen in FIG. 4, the first wireless downlink signal 440 and the second wireless downlink signal 450, while co-located on the same access point 410, may travel different distances between the access point 410 where the first node 412 and the second node 422 and the WCD 300. As such, the first wireless downlink signal 440 and the first wireless uplink signal 446 may travel a first distance 442 between the first node 412 and the WCD 300. The second wireless downlink signal 450 may travel a second distance 444 between the first node 412 and the WCD 300. Alternatively, it is possible that when the first node 412 and second node 422 are co-located, the first wireless downlink signal 440, the first wireless uplink signal 446, the second wireless downlink signal 450, and the second wireless uplink signal 452 travel the same distance.

As previously mentioned, the analyzer 218 analyzes at least one set of data (noise interference, location, time of day, etc.) to determine the updated power transmission for the first communication protocol 470 and the second communication protocol 472. Then, as mentioned, the instructor 224 instructs the WCD 300 to subsequently communicate to the access point 410 the updated transmission power for the first communication protocol 470 and the second communication protocol 472. As mentioned, FIGS. 3a-3c illustrate active wireless communication sessions in three different settings. To further illustrate the features of the system described herein, additional examples utilizing FIGS. 3a-3c with FIG. 4 are presented herein.

First, turning to FIG. 3a with FIG. 4, an active wireless communication session is ongoing between the WCD 300 and an access point 410. While not shown in FIG. 3a, at least one access point 410, similar to or the same as access point 410 shown in FIG. 4 is located within a specific distance from the location shown in FIG. 3a. Individual 302 is enjoying her morning coffee while the WCD 300 is transmitting signal 304 to an access point. As such, the specific access point 410 would transmit wireless downlink signals such as downlink signals 440 and 450 from either or both of the first node 412 and second node 422 to the WCD 300 using the first communication protocol 470 and second communication protocol 472.

For the purpose of this non-limiting example, the wireless communication session between the WCD 300 and access point 410 is taking place around 8:00 AM in a suburban neighborhood with a small population surrounding. As such, the dynamic power allocation engine 212, via the collector 216, collects at least one set of data applicable to the current wireless communication session. The at least one set of data collected may include, but is not limited to, the present location of the WCD 300, the time of day (8:00 AM), the number of other WCDs 300 within a predetermined radius or area that are also actively communicating with the access point 410, current noise interference, and historical data such as average noise interference within the specific area or cell during the same time period on the same days of the week. Analyzer 218 then takes the collected present and historical data and collectively analyze the data.

Following this, the determiner 224 will determine the updated transmission power for both the first communication protocol 470 and the second communication protocol 472. In this example, the determiner 224 may determine that historical data shows low noise interference during the early morning hours in the geographic area where individual 302 is located. As such, the determiner 220 may determine that the updated transmission power for the first communication protocol 470 is 0 dBm while the updated transmission power for the second communication protocol 72 is 15 dBm. Following this, the instructor 224 proactively instructs the WCD 300 to communicate to the access point 410 the updated transmission power for the first and second communication protocols 470 and 472. In the instance where the first communication protocol is a 5G wireless communication protocol and the second communication protocol is a 4G communication protocol, the updated transmission power for the 5G communication protocol would be 0 dBm while the 4G communication protocol would be 15 dBm. While this example discusses an updated transmission power for 0 dBm for the first communication protocol, it is contemplated that any range of transmission power within the maximum range (up to 23 dBm) for the first communication protocol is possible.

The automatic and proactive instruction of the updated transmission powers described herein creates a more effective and better user experience since the transmission power of the uplink and downlink signals between the access point 410 and the WCD 300 is immediately and automatically set to the most effective transmission power levels based on the at least one set of data analyzed. This is an important and useful improvement to prior technology, where the instructor would be required to communicate multiple times to the access point 410 updated transmission powers for each communication protocol. In other words, in previous systems, the instructor 224 would have had to continue to adjust the transmission power over the first communication protocol and second communication protocol over a time period prior to reaching the most effective transmission power for the best wireless communication session between the WCD 300 and the access point 410.

Next, returning to FIG. 3b in view of FIG. 4, there are multiple vehicles utilizing WCDs 300 within one small area in FIG. 3b, which would lead to higher noise interference levels than may be seen in FIG. 3a. As such, the analyzer 218 analyzes the various present and historical data collected so the determiner 220 can then determine the updated transmission power for each communication protocol. Here, the determiner 220 may determine that both the first communication protocol (e.g. 5G) 470 and the second communication protocol 472 (e.g. 4G)'s updated transmission power needs to be higher in order to balance out the noise interference coming from multiple WCD's 300 within the same area. As such, the determiner 220 may determine that the updated transmission power on the first communication protocol 470 should be 8 dBm and the updated transmission power on the second communication protocol 472 should be 12 dBm.

It is further contemplated that each device 318, 320, 322, and 324 may have different updated transmission powers determined for each communication protocol based on each individual WCD 300. For example, not every WCD 300 shown may be capable of utilizing 5G wireless technology. As such, if WCD 318 is equipped for 4G only, the updated transmission power for the first communication protocol 470 would be 0 dBm and the second communication protocol's 472 updated transmission power may be determined to be 20 dBm to have an optimal wireless communication session.

Additionally, the system 400 may begin the process of proactively determining the updated power transmission to WCDs 318, 320, 322, and 324 as soon as or prior to the device entering the specific area. Based on artificial intelligence and historical data including past WCD locations over a period of time, the system may be able to predict the route of an individual such as individual 312. As such, the instructor 224 may instruct the WCD 300 to communicate to the access point 410 as soon as the device has entered the specific area so that the updated transmission power is applied for the first communication protocol 470 and the second communication protocol 472 almost immediately. This is advantageous as it will allow for a more optimal, efficient, and effective wireless communication session if the updated power transmission for each protocol are effectively set to the appropriate level immediately rather than going through a ramp up time where the transmission power might be incrementally increased or decreased on each protocol until the correct transmission power for each communication protocol is reached.

Similarly, viewing FIG. 3c with FIG. 4, the components of the dynamic power allocation engine 212 will collect, analyze, determine and instruct the WCD 300 as previously described. In FIG. 3c, individual 356 is using a WCD 300 within a high rise building 354 surrounded by several other high rise buildings 350, 352, and 354 in which there are several individuals utilizing WCDs. The image depicted in FIG. 3c shows a scenario in which the level of noise interference would be higher than that seen in FIGS. 3a and 3b due to the high number of individuals within the area utilizing WCDs 300. As such, the determiner 220, based on historical and present data collected, will determine the updated power transmission for the first communication protocol 470 and second communication protocol 472 for individual 356's WCD. Based on the specific capabilities of the individual 356's WCD, the determiner 224 will determine what updated transmission power for each communication protocol is needed in order to have the optimal wireless communication session. Given how many users may be utilizing their WCDs in this area, the determiner 220 may determine that the first communication protocol 470 and second communication protocol 472 should each be set at 13 dBm for an optimal user experience. After the determination is made, the instructor 224 will proactively communicate the updated transmission power for each protocol to the access point 410.

Additionally, as previously mentioned, the system 400 may periodically or on a predetermined schedule, collect at least one set of data and utilized such data to determine the updated transmission power. For example, if the initial determination of 13 dBm was made at 1:00 PM on a weekday (Monday through Friday), then the system 400 may repeat the process again at 6:00 PM. At 6:00 PM, the system 400 may utilize the historical data and present data and determine that the transmission power for each communication protocol can be decreased since the noise interference has decreased after prime work hours. Based on this determination, the instructor 224 would then instruct the WCD 300 to communicate to the access point 412 to decrease the updated transmission power for each of the first communication protocol 470 and the second communication protocol 472 to the appropriate power level determined. This is unlike previous systems where the updated transmission power would have been decreased incrementally until the correct level was achieved based on the updated data analysis. Instead, in the current system, the updated transmission power is determined and then proactively updated to the determined updated transmission power, without any sort of ramp up or down time. While various examples have been presented for the updated transmission power levels, any and all combination of power levels that do not exceed the maximum power transmission allowable for each protocol is contemplated herein.

Figure 5:
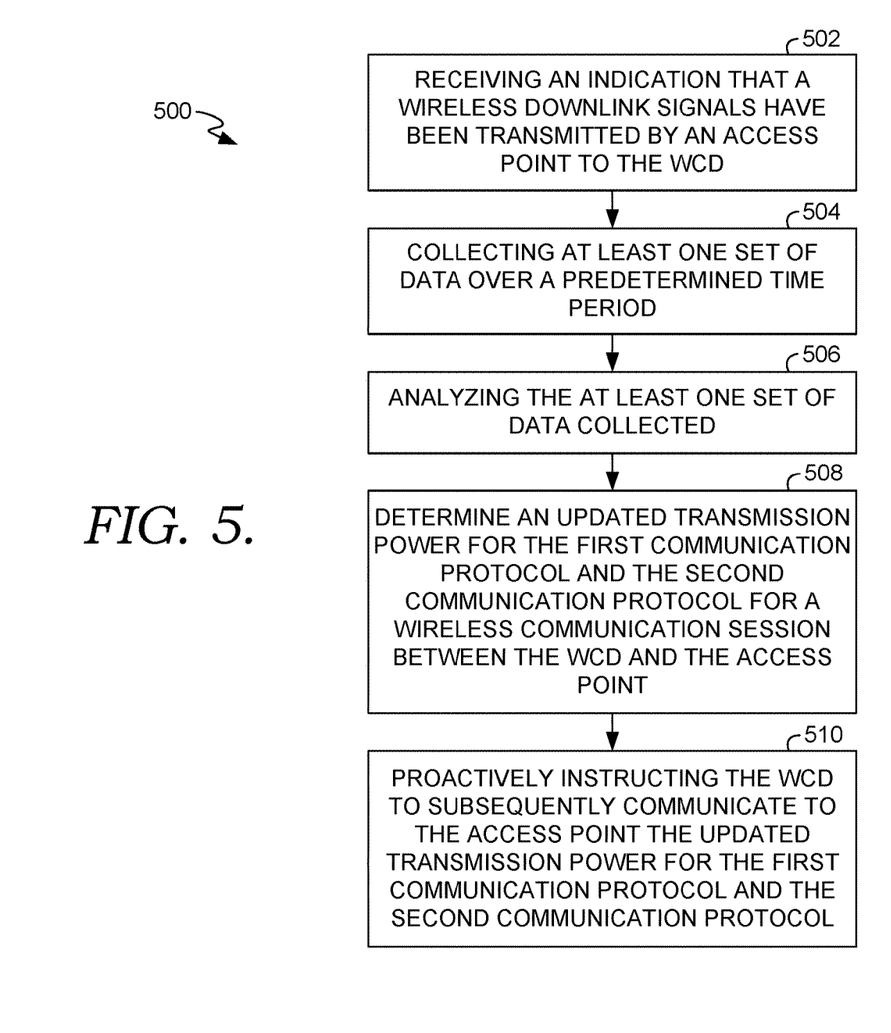
FIG. 5 depicts a flow diagram of an exemplary method for proactive uplink power transmission variation on a first communication protocol and a second communication protocol, in accordance with aspects herein.

Next, FIG. 5 depicts a flow diagram of an exemplary method for proactive uplink power transmission variation on a first communication protocol and a second communication protocol. Initially at block 502, a WCD, an access point, and/or any other processor such as a network controller, or any other device, engine, or component communicatively coupled to the wireless communication network and capable of determining one or more network parameters receives an indication that a wireless downlink signal has been transmitted by an access point to a WCD. In aspects, the wireless downlink signal may be communicated by the access point according to a first communication protocol (e.g., 4G) and/or a second communication protocol (e.g. 5G). The access point may also comprise a first node and a second node. The WCD receives a first downlink signal via the first communication protocol from the first node located at an access point and a second downlink signal via the second communication protocol from the second node located at an access point. In some aspects, the first communication protocol may be different than the second communication protocol. In other aspects, the first communication protocol may be the same protocol as the second communication protocol, but the first wireless downlink and uplink signals may be communicated in different frequency bands/channels than the second wireless downlink and uplink signals. For example, with the invention of the 5G wireless network, 5G capable WCDs may attach to both a 4G node and a 5G node, while other devices that are not 5G capable are limited to connecting on other nodes such as 4G or 3G.

At block 504 at least one set of data over a predetermined period of time is collected by the collector 216. Then, at block 506, after the at least one set of data is collected, the at least one set of data is analyzed by analyzer 218. Once analyzed, at step 508, the determiner 220 will determine an updated transmission power of the first communication protocol and the second communication protocol for a wireless communication session between the WCD and the access point. In aspects, the one or more updated transmission power may be based on any combination of the historical data regarding the first wireless downlink signal, a first wireless uplink signal, the second wireless downlink signal, and a second wireless uplink signal, wherein the first wireless uplink signal uses the same protocol as the first wireless downlink signal (e.g., 4G), and the second wireless uplink signal uses the same protocol as the second wireless downlink signal (e.g., 5G). The one or more sets of data collected may comprise path loss, SINR, multipathing, atmospheric ducting, location of the WCD, distance between the WCD and an access point, height of eye of the WCD, line of sight between the WCD and an access point, or any other atmospheric, electrical, electromagnetic, or mechanical effect or phenomenon. For example, at block 506, at least one set of data collected (e.g. path loss) may be determined for a first wireless downlink signal, and a second set of data collected (WCD location relative to each of the access point) may be determined. By analyzing one or more sets of data, the system then determines, at step 508, what the updated transmission power for the first communication protocol (e.g. 5G) and second communication protocol (e.g. 4G), thereby determining how much power can be dynamically allocated on each communication protocol in order to have the most optimal and effective wireless communication session. After the updated power transmissions are determined, the instructor, at step 510, proactively instructs the WCD to subsequently communicate to the access point the updated transmission power for the first communication protocol and the second communication protocol.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for proactively determining optimal downlink power for transmission to a wireless communication device (WCD), the system comprising:
an access point configured to transmit wireless downlink signals to the WCD using a first communication protocol and a second communication protocol; and
a processor, the processor configured to perform operations comprising:
collecting at least one set of historical and present network parameter data over a predetermined time period comprising one or more of communication channel quality, device power levels, and user device capacity;
analyzing the at least one set of historical and present network parameter data collected to determine an uplink footprint for the WCD and an optimal transmission power level for the first communication protocol and the second communication protocol for a wireless communication session between the WCD and the access point; and
in response to the determined optimal transmission power level for the first communication protocol and the second communication protocol, proactively instructing the WCD to subsequently communicate to the access point the optimal transmission power level for the first communication protocol and the second communication protocol.

2. The system of claim 1, wherein the first communication protocol is a 4G network technology.

3. The system of claim 1, wherein the second communication protocol is a 5G network technology.

4. The system of claim 1, wherein the access point communicates with the WCD using an eNodeB.

5. The system of claim 1, wherein the access point communicates with the WCD using a gNodeB.

6. The system of claim 1, wherein the access point, via the first communication protocol, transmits a first wireless downlink signal to the WCD.

7. The system of claim 1, wherein the access point, via the second communication protocol, transmits a second wireless downlink signal to the WCD.

8. The system of claim 1, wherein the at least one set of historical and present network data comprises location information for a WCD.

9. The system of claim 1, wherein the at least one set of historical and present network data comprises signal to noise ratio for one or more transitory signals communicated between the WCD and each of the first communication protocol and second communication protocol.

10. The system of claim 1, wherein the optimal transmission power level is between 0 dBm and 23 dBm.

11. The system of claim 1, wherein the sum of the optimal transmission power level for the first communication protocol and the second communication protocol is 29 dBm.

12. The system of claim 1, wherein the optimal transmission power level for the first communication protocol does not equal the optimal transmission power level for the second communication protocol.

13. The system of claim 1, wherein the at least one set of historical and present network data comprises path loss between the WCD and each of the first communication protocol and the second communication protocol.

14. The system of claim 1, wherein the first set of data comprises sector interference in a predetermined geographic location or region.

15. A method for proactively determining optimal uplink power for transmission to a wireless communications device (WCD), the method comprising:
- receiving an indication that wireless downlink signals have been transmitted by an access point to the WCD;
- collecting at least one set of historical and present network parameter data over a predetermined time period comprising one or more of communication channel quality, device power levels, and user device capacity;
- analyzing the at least one set of historical and present network parameter data collected to determine an uplink footprint for the WCD and an optimal transmission power level for the first communication protocol and the second communication protocol for a wireless communication session between the WCD and the access point; and
- in response to the determined optimal transmission power level for the first communication protocol and the second communication protocol, proactively instructing the WCD to subsequently communicate to the access point the optimal transmission power level for the first communication protocol and the second communication protocol.

16. The method of claim 15, wherein the access point comprises a first node and a second node.

17. The method of claim 16, wherein the first node communicates with the WCD via the first communication protocol.

18. The method of claim 16, wherein the second node communicates with the WCD via the second communication protocol.

19. A non-transitory computer storage media storing computer-usable instructions that, when used by one or more processors, cause the one or more processors to:
- receive an indication that wireless downlink signals have been transmitted by an access point to the WCD;
- collect at least one set of historical and present network parameter data over a predetermined time period comprising one or more of communication channel quality, device power levels, and user device capacity;
- analyze the at least one set of historical and present network parameter data collected to determine an uplink footprint for the WCD and an optimal transmission power level for the first communication protocol and the second communication protocol for a wireless communication session between the WCD and the access point; and
- in response to the determined optimal transmission power level, proactively instruct the WCD to subsequently communicate to the access point the optimal transmission power level for the first communication protocol and the second communication protocol.

20. The non-transitory computer store media of claim 19, wherein the optimal transmission power level for the first communication protocol and the second communication protocol varies throughout a predetermined time period based on the analysis of the at least one set of historical and present network parameter data.

* * * * *